(12) United States Patent
Togou

(10) Patent No.: US 8,137,495 B2
(45) Date of Patent: Mar. 20, 2012

(54) METHOD OF PRODUCING A PNEUMATIC TIRE

(75) Inventor: Hiroyuki Togou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 448 days.

(21) Appl. No.: 12/440,568

(22) PCT Filed: Aug. 8, 2007

(86) PCT No.: PCT/JP2007/065549
§ 371 (c)(1),
(2), (4) Date: Mar. 9, 2009

(87) PCT Pub. No.: WO2008/041415
PCT Pub. Date: Apr. 10, 2008

(65) Prior Publication Data
US 2010/0000651 A1   Jan. 7, 2010

(30) Foreign Application Priority Data
Sep. 29, 2006   (JP) ................................. 2006-268328

(51) Int. Cl.
*B60C 9/08*   (2006.01)
*B60C 9/18*   (2006.01)
*B60C 9/20*   (2006.01)
*B60C 9/22*   (2006.01)

(52) U.S. Cl. ........ 156/117; 152/527; 152/531; 152/533; 152/535; 152/536; 156/123

(58) Field of Classification Search .......... 152/126–136, 152/556, 557, 526–536; 156/117, 123
See application file for complete search history.

(56) References Cited

U.S. PATENT DOCUMENTS

| 5,685,928 | A | 11/1997 | Toyoda |
| 2004/0163748 | A1 | 8/2004 | Ueyoko |
| 2005/0056359 | A1* | 3/2005 | Ueyoko et al. ................. 152/548 |
| 2005/0194081 | A1* | 9/2005 | Yano et al. .................... 152/527 |
| 2006/0000536 | A1 | 1/2006 | Ueyoko |

FOREIGN PATENT DOCUMENTS

| JP | 06-297914 A | | 10/1994 |
| JP | 08-164710 A | | 6/1996 |
| JP | 11048706 | * | 2/1999 |
| JP | 2002-211208 A | | 7/2002 |
| JP | 2004-216988 A | | 8/2004 |
| JP | 2004-256097 A | | 9/2004 |
| WO | 03/061991 A1 | | 7/2003 |

* cited by examiner

*Primary Examiner* — Katarzyna Wyrozebski Lee
*Assistant Examiner* — Scott W Dodds
(74) *Attorney, Agent, or Firm* — Sughrue Mion, PLLC

(57) ABSTRACT

A method of producing a pneumatic tire in which, a cord material of a secondary belt layer has a larger thermal shrinkage rate than that of the primary belt layer to effectively suppress the radial expansion of a tire and advantageously improve cutting-resistance of a tread as in the conventional tire. In the method, a ribbon-shaped strip 22 is folded in a region R, in a developed plan view of a material 21 forming the secondary belt layer, between a side end e of the forming material 21 and a position distanced from the side end toward the tire equatorial side by ¼ of the overall width of the forming material, such that the thus bent ribbon-shaped strip 22 extends in a curved manner to build a green tire.

2 Claims, 6 Drawing Sheets

METHOD OF PRODUCING A PNEUMATIC TIRE

TECHNICAL FIELD

The present invention relates to a method of producing a pneumatic tire, especially to a method of producing a pneumatic radial tire suitable for use in an airplane. In particular, the present invention proposes a technique which effectively prevents deterioration of durability of belts including a primary belt and a secondary belt without increasing tire weight, with keeping the thermal shrinkage rate of a cord material of a secondary belt layer provided on the outer peripheral side of the primary belt larger than that of the primary belt layer.

RELATED ART

Examples of a pneumatic radial tire suitable for use in an airplane, which suppresses radial expansion of a tread surface, improves durability against cutting injuries caused by an external substance and also allows the tire weight to be reduced, include WO 03/061991 filed by the applicant.

The tire of the present invention comprises: a pair of bead cores; a carcass layer constituted of at least one carcass ply extending in a troidal shape from one bead core to the other bead core; and a belt layer constituted of at least one belt ply including organic fiber cord and provided on the tire radial direction outer side of the carcass layer at the outer peripheral surface thereof in the crown region, wherein given the overall strength $K0$ of a belt layer of the tire in the circumferential direction per unit width at the tire equatorial plane position, and the overall strength $K2$ of a belt layer of the tire in the circumferential direction per unit width at a width position that is ⅔ of the maximum width of the belt layer with the tire equatorial plane as the center, $K2<K0$. A primary belt layer of the belt layers preferably has a belt ply including an aromatic polyamide fiber cord spirally wound around at a winding angle of substantially 0° with respect to the tire equatorial plane. Further, a secondary belt layer provided on the tire radial direction outer side of the primary belt, of the belt layers, has a belt ply including organic fiber cords extending in a zigzag shape in the tire circumferential direction by being bent in the same plane to incline toward the opposite direction at each ply end. Yet further, the organic fiber cords of the secondary belt layer are nylon fiber cords having larger thermal shrinkage rate than aromatic polyamide fiber cords.

DISCLOSURE OF THE INVENTION

In the conventional tire, due to the structure thereof described above, the nylon fiber cord forming the secondary belt layer makes larger thermal shrinkage than the aromatic polyamide fiber cords forming the primary belt layer disposed on the inner peripheral side of the secondary belt layer. As a result, the nylon fiber cords and thus the secondary belt layer, which are bent in a zigzag shape in the same plane and extend linearly between the bent portions thereof, tend to approach the primary belt in an extreme manner and the thermal-shrunk nylon fiber cords tend to disturb the sequence of the aligned aromatic polyamide fiber cords, whereby, when the tire rotates with a load applied thereon, interlayer distortion concentrates between the secondary belt and the primary belt and/or between the belts of the primary belt, generating separation due to deterioration caused by stress, heat and the like, in the inter-layer rubber. Further, in such a state, the primary belt can no longer exert sufficient strength against an action of relatively large force, resulting in a problem that duration of the belts inevitably deteriorates.

In view of this, there has been proposed setting the rubber thickness between the respective belts relatively thick in advance to prevent the thermal-shrunk nylon fiber cords from being bit-in toward the primary belt layer side. However, in this case, there arises a problem that the weight and heat generation of the tire inevitably increases.

An object of the present invention is to solve the problems of the conventional techniques as described above. Specifically, an object of the present invention is to provide a method of producing a pneumatic tire in which, while using a cord material of a secondary belt layer having larger thermal shrinkage rate than that of the primary belt layer to effectively suppress the radial expansion of a tire and advantageously improve cutting-resistance of a tread as in the conventional tire, deterioration of durability of belts including the primary belt and the secondary belt can be effectively prevented without increasing the tire weight.

Means for Solving the Problem

A method of producing a pneumatic tire of the present invention, the pneumatic tire having: a pair of bead cores; a carcass having a structure in which at least one carcass ply troidally extends between the bead cores, the structure may be a radial structure; a primary belt including a plurality of primary belt layers disposed on the outer peripheral side of the carcass in the crown region thereof; and a secondary belt including at least one secondary belt layer disposed on the outer peripheral side of the primary belt, each primary belt layer being generally formed by a plurality of aligned aromatic polyamide cords spirally wound in an annular sectional shape and preferably rubber-coated, the secondary belt layer being formed by a ribbon-shaped strip of organic fiber cords having a larger thermal shrinkage rate than that of the aromatic polyamide cords, the ribbon-shaped strip being formed by bending a belt-shaped member as one or plural aligned and rubber-coated cords in a zigzag shape at positions corresponding to respective side ends of the secondary belt layer to extend in the circumferential direction, the method comprising: folding the ribbon-shaped strip in a region, in a developed plan view of a material forming the secondary belt layer, between a side end of the forming material and a position distanced from the side end toward the tire equatorial side by ¼ of the overall width of the forming material, such that the thus bent ribbon-shaped strip extends in a curved manner toward either side end of the forming material; and molding a green tire.

In the present specification, "a thermal shrinkage rate" represents a thermal shrinkage rate according to the test-ride method, in a case in which heating is performed at 177° C. for 2 minutes.

Preferably, in a developed plan view of the forming material of the secondary belt layer, given that the linear shortest distance between a position shifted from a side end of the forming material toward the tire equatorial side by the distance corresponding to the widthwise dimension of the bent ribbon-shaped strip and a position distanced from the side end toward the tire equatorial side by ¼ of the overall width of the forming material, i.e. the linear distance linking the widthwise center points of the ribbon-shaped strip between the above two positions, is A, the curved extension length corresponding to the line linking the widthwise-center points of the ribbon-shaped strip between the above two positions is B, the thermal shrinkage rate of the aromatic polyamide cord is α(primary) %, and the thermal shrinkage rate of the organic fiber cord is α(secondary) %, the dimensions A and B satisfy a formula below.

$$\alpha(\text{secondary})\% - \alpha(\text{primary})\% - 3\% < (B-A)/B \times 100\% < \alpha(\text{secondary})\% - \alpha(\text{primary})\% + 10\%$$

Effect of the Invention

According to the invention, when a built green tire is subjected to vulcanization molding, while the organic fiber cords contributing to formation of the secondary belt layers thermally shrinks more significantly than the aromatic polyamide cords contributing to formation of the primary belt layers do, the ribbon-shaped strip including the organic fiber cords in the preset shape in which the organic fiber cords extend in a curved manner effectively absorbs the difference in magnitude of thermal shrinkage between the organic fiber cords and the aromatic polyamide cords by the change in the extension shape of the organic fiber cords, which occurs from the curved portions to the linear portions where the curvature disappears. Therefore, according to the present invention, the various problems as described above caused by difference in thermal shrinkage rate between the two types of cords can be solved without increasing rubber thickness between the respective belt layers, whereby deterioration in durability of the belts can be sufficiently prevented.

The extension shape of ribbon-shaped strip is specified only in a region between each side end position of the forming material of the secondary belt layer and the position distanced from the side end toward the tire equatorial side by ¼ of the overall width of the forming material, because the magnitude of misalignment between the primary and secondary belt layers caused by the difference in thermal shrinkage rate thereof is relatively small in the center region of which width is ⅔ of the overall width of the forming material and the magnitude of misalignment increases toward the side ends.

Further, the good effect of the present invention described above is especially distinctive when the following requirements are met. In the region described above and in view of the widthwise dimension of the ribbon-shaped strip, given that the shortest length of each linear portion of the ribbon-shaped strip is A, the curved extension length corresponding to the line connecting the widthwise-center points of the ribbon-shaped strip is B, the thermal shrinkage rate of the aromatic polyamide cord is α(primary) %, and the thermal shrinkage rate of the organic fiber cord is α(secondary) %, the dimensions A and B satisfy a formula below.

$$\alpha(\text{secondary})\% - \alpha(\text{primary})\% - 3\% < (B-A)/B \times 100\% < \alpha(\text{secondary})\% - \alpha(\text{primary})\% + 10\%$$

More specifically, when $(B-A)/B \times 100\%$ is equal to or below the aforementioned lower limit, the organic fiber cords of the secondary belt layers are bit in by the primary belt layer in a manner similar to what was described in context with the conventional tire, causing deterioration of durability of the belts. On the other hand, when $(B-A)/B \times 100\%$ is equal to or exceeds the aforementioned upper limit, the tension load against the secondary belt layer is reduced too much, resulting in insufficient pressure-resistance strength of the belts.

EXPLANATION OF REFERENCE NUMBERS

Figure 1:
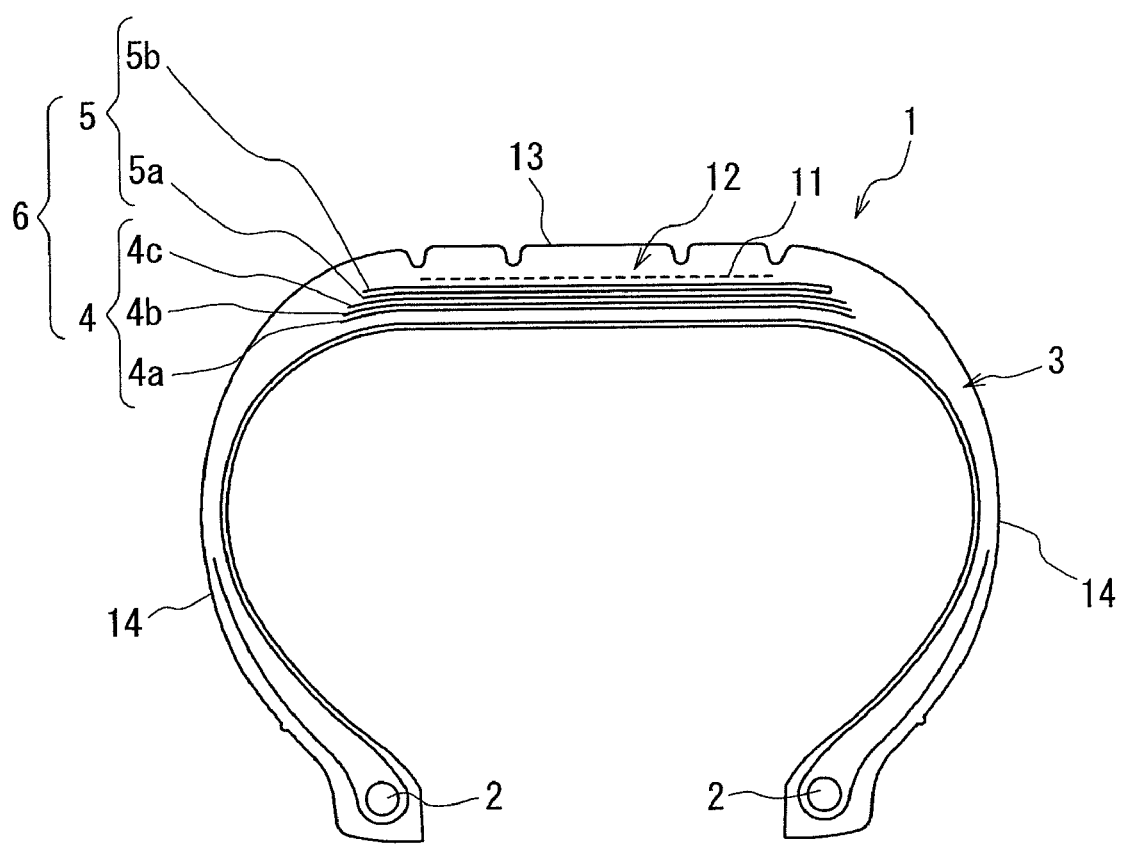
FIG. 1 is a widthwise sectional view showing an example of a pneumatic tire produced by the method of the present invention.

1 Production tire
2 Bead core
3 Carcass
4 Primary belt
4a, 4b, 4c Primary belt layer
5 Secondary belt
5a, 5b Secondary belt layer
6 Belt
7 Aromatic polyamide cord
8 Belt-shaped member
9 Organic fiber cord
10 Ribbon-shaped strip
11 Wavy bending cord
12 Belt protection layer
13 Tread
14 Sidewall
21 Forming material
22 Ribbon-shaped strip
23 Organic fiber cord
e Side end
W Width of forming material
R Side portion region
$R_0$ Center region
w1 Width of ribbon-shaped strip
A Shortest distance of the linear portion
B Curved extension length

BEST MODE FOR CARRYING OUT THE INVENTION

FIG. 1 is a widthwise sectional view of a pneumatic tire such as a pneumatic radial tire for use in an airplane, produced by the method according to the invention. A product tire 1 includes: a pair of bead cores 2; a carcass 3 of, for example, a radial structure comprising six carcass plies troidally extending between the bead cores 2 and having side portions thereof folded over the bead cores 2; a primary belt 4 constituted of, for example, three primary belt layers 4a, 4b, 4c as shown in the drawing and disposed on the outer peripheral side of the carcass 3 in the crown region thereof; and a secondary belt 5 constituted of at least one, for example, two secondary belt layers 5a, 5b as shown in the drawing and disposed on the outer peripheral side of the primary belt 4. The primary belt 4 and the secondary belt 5 constitute a belt 6.

Figure 2:
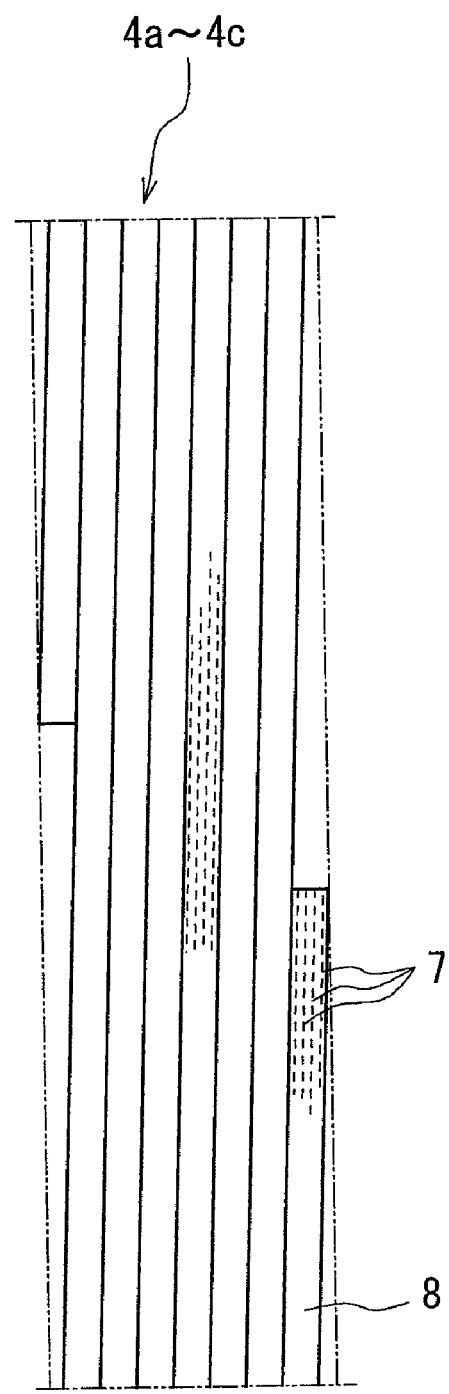
FIG. 2 is a developed plan view showing a structure of a primary belt layer.

In the present embodiment, the respective primary belt layers 4a, 4b, 4c are formed, as exemplarily shown in a developed plan view in FIG. 2, by aligning one or plural, for example, three to ten aromatic polyamide cords 7, integrally coating these cords with rubber to produce a belt-shaped member 8 of a predetermined width and spirally winding the belt-shaped member 8 around the carcass 3 in the crown region thereof so as to have an annular shape. The respective secondary belt layers 5a, 5b are formed, as exemplarily shown in a developed plan view in FIG. 3, by aligning one or plural, for example, three to ten organic fiber cords 9 such as nylon or the like having larger thermal shrinkage rate than that of the aromatic polyamide cords 7, integrally coating these cords with rubber to produce a ribbon-shaped strip 10 having width of 5-20 mm, and zigzag bending the ribbon-shaped strip 10 in the same plane at positions corresponding to respective side ends of the secondary belt layer to be formed, so as to extend in the circumferential direction.

In the structure described above, the ribbon-shaped strip 10 extends such that the strip completes one widthwise reciprocal stroke when the strip completes one circumferential stroke around the primary belt 4, for example, by extending at an angle in a range of 5 to 25° with respect to the tire equatorial plane such that the organic cords extend linearly slanted in a zigzag manner. Further, the ribbon-shaped strip 10 circumferentially extends to make plural circumferential strokes, with the strips contacting each other, so that gaps should not be formed between the ribbon-shaped strips 10 disposed adjacent in the circumferential direction. Due to this, the organic fiber cords 9 are provided in a sufficiently even manner across the overall width of the secondary belt, with the cords crossing with other.

It should be noted that, in the extension form of the ribbon-shaped strip 10 as shown in the drawings, the number of the secondary belt layers is counted as two.

Figure 4:
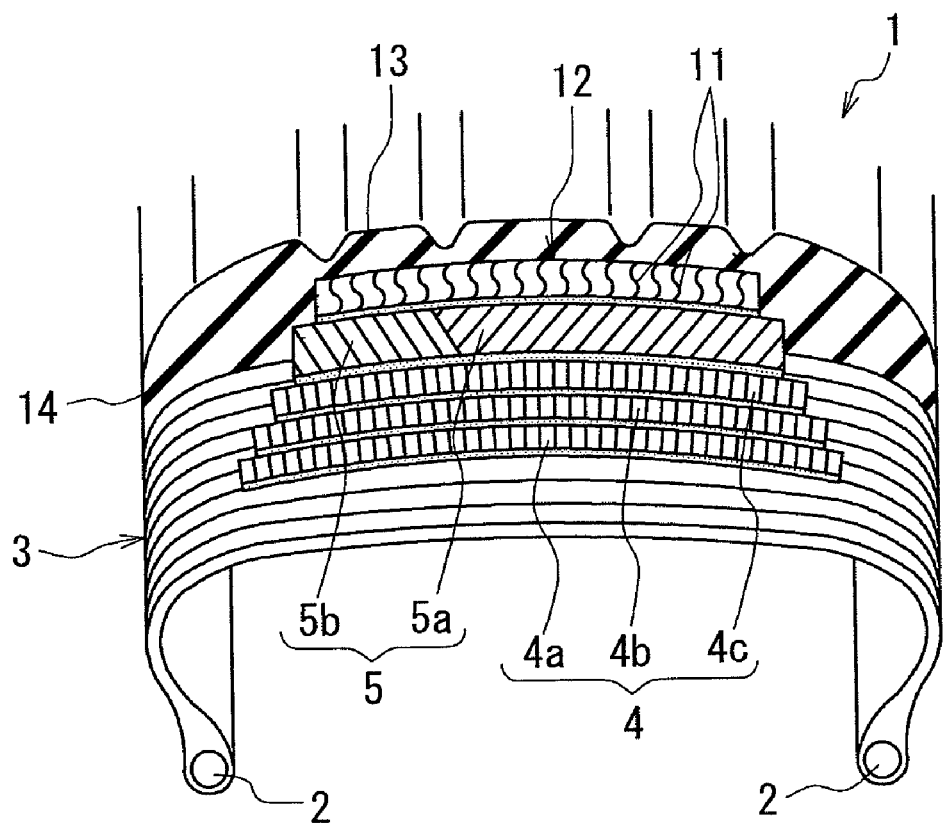
FIG. 4 is a sectional perspective view showing a reinforcement structure of the tire of FIG. 1.
Figure 5:
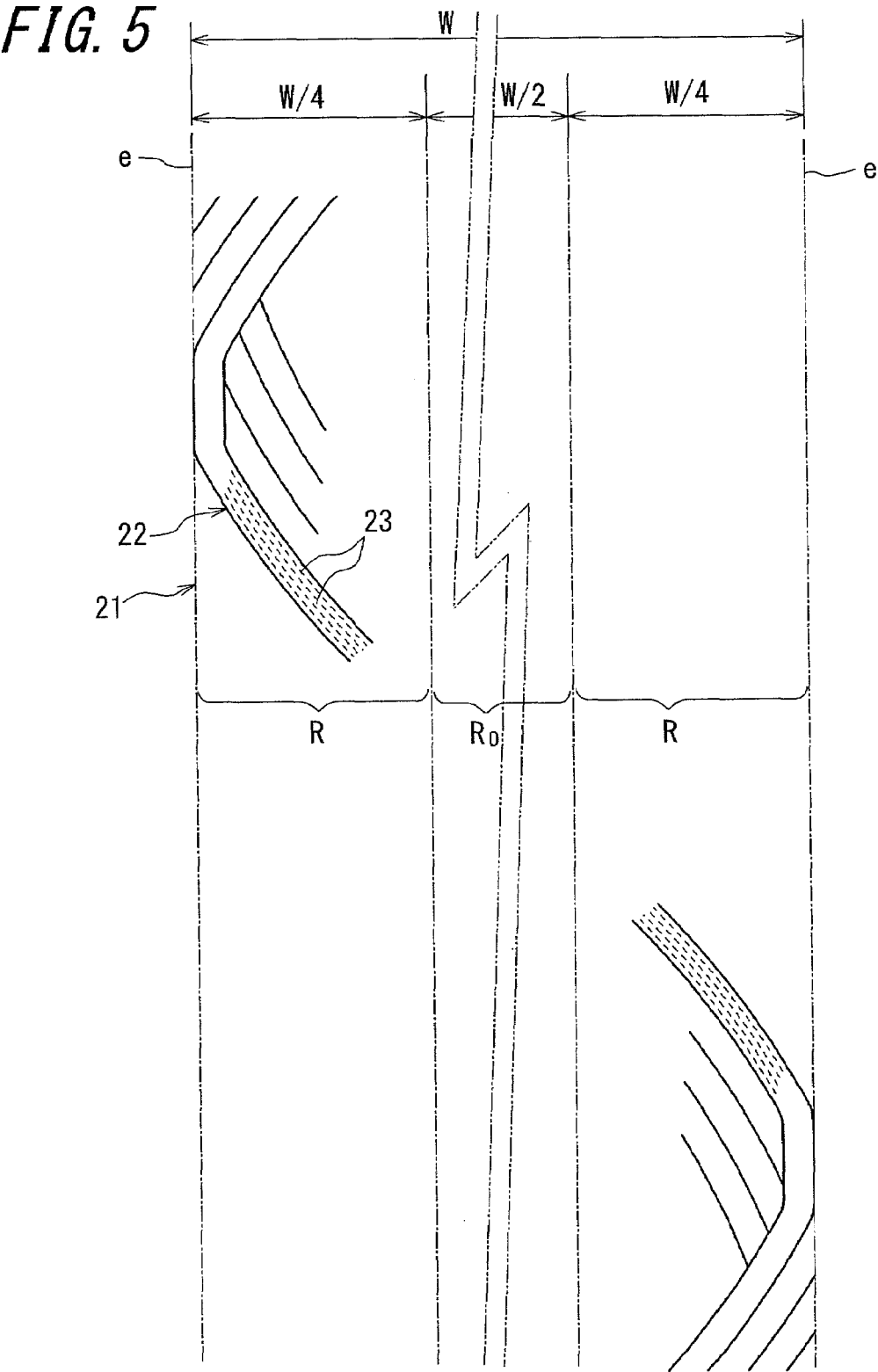
FIG. 5 is an enlarged and developed plan view showing a forming material of the secondary belt layer.

Further, as is obvious from the sectional perspective view of FIG. 4, the tire as shown further includes, on the outer peripheral side of the belt 6 structured as described above, cords 11 circumferentially extending in a wavy bending manner and at least one belt protection layer 12 formed by organic fiber cords.

In FIGS. 1 and 4, the reference number 13 indicates a tread which forms a ground contact face of a tire and the reference number 14 indicates a sidewall specifying a side contour portion of the tire, respectively.

Figure 3:
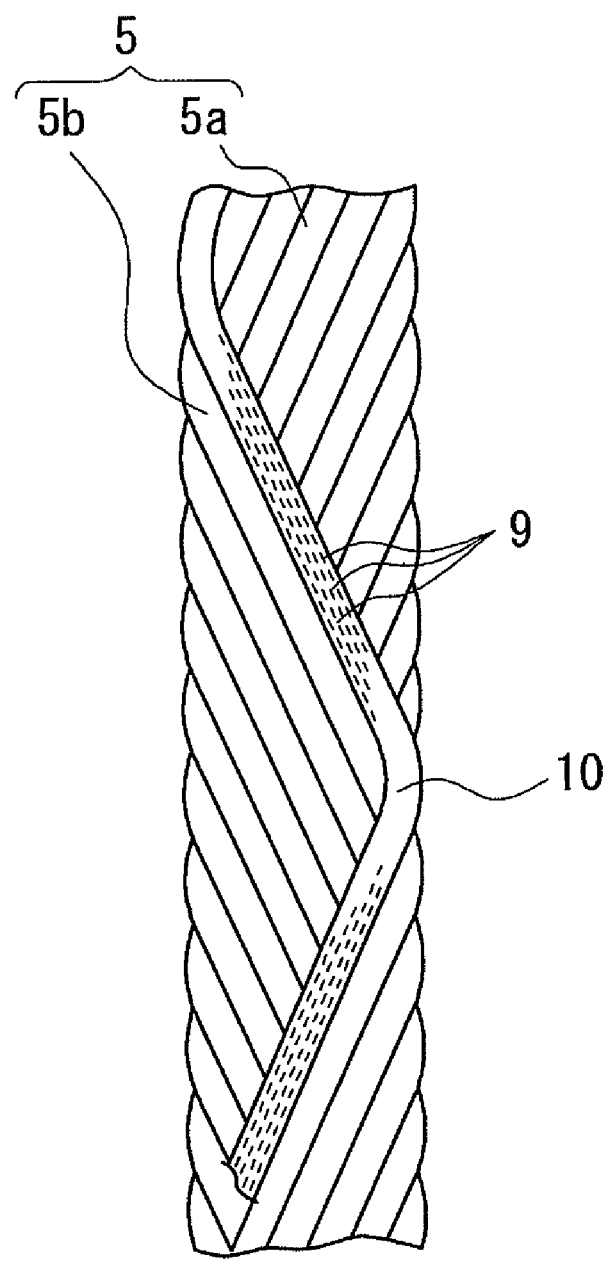
FIG. 3 is a developed plan view showing a structure of a secondary belt layer.

The tire producing method according to the present invention aims at preventing, in the secondary belt layers 5a, 5b of the product tire as described above where the ribbon-shaped strip 10, i.e. the organic fiber cords 9 having a relatively high thermal shrinkage rate, linearly extend between the bent portions thereof as shown in FIG. 3, the organic fiber cords 9 from being bit in by the primary belt 4. In order to achieve this object, in the building process of a green tire according to the present invention, when a forming material of the secondary belt layers 5a, 5b is structured, the forming material is formed such that the bent ribbon-shaped strip 22 extends in a curved manner within a side region R between each side end e of the forming material 21 and a position shifted from the side end position toward the tire equatorial side by ¼ of the overall width W of the forming material 21, i.e. a position distanced from the side end toward the center line side of the width W.

In this case, the curving direction of the ribbon-shaped strip 22 and the organic fiber cords 23 embedded therein may be a direction of externally expanding from each bent portion of the strip 22 as a turning point, as shown in the drawing. It should be noted that the extension form of the ribbon-shaped strip 22 within the central region $R_0$ of the width of W/2, defined at the widthwise central portion of the forming material 21, is preferably a linearly extending shape without curvature.

Figure 6:
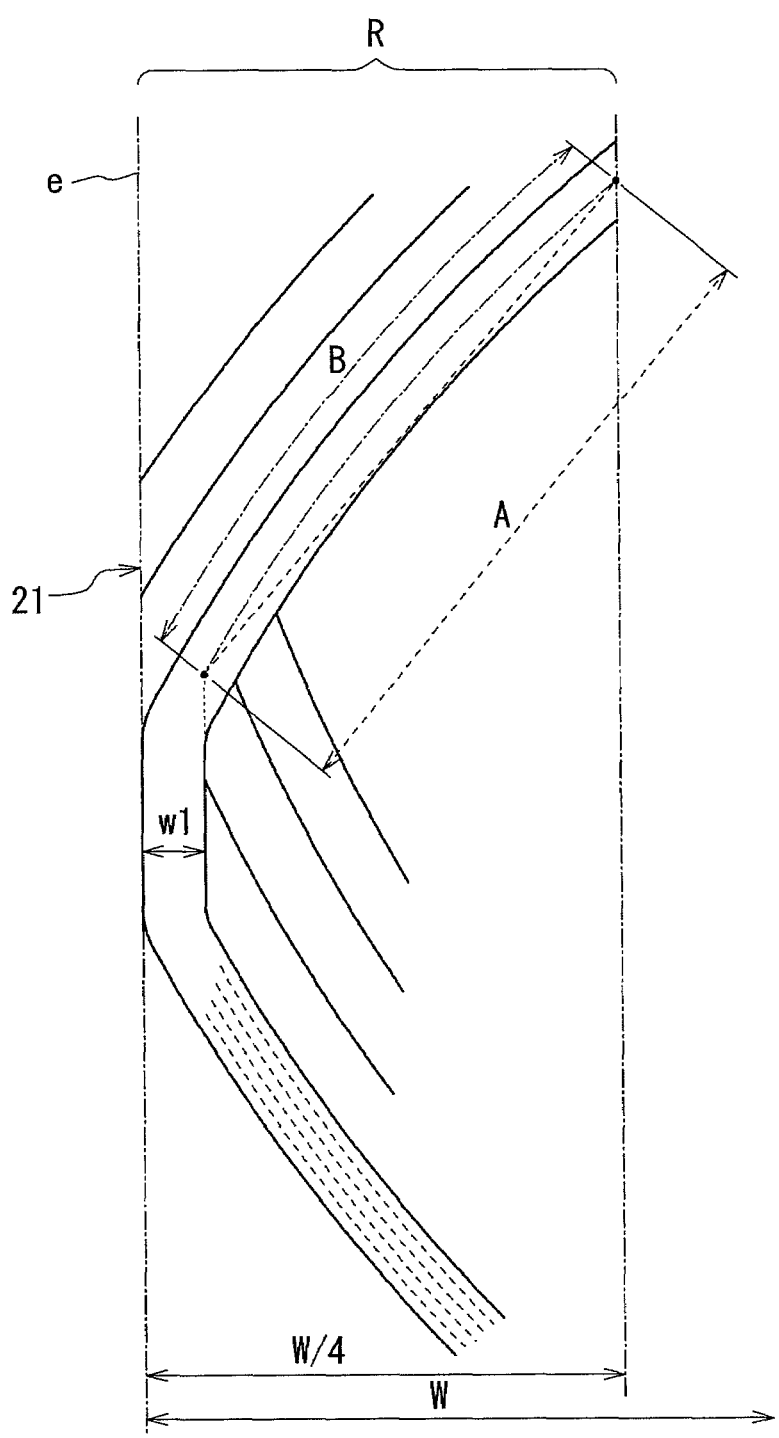
FIG. 6 is an illustrative explanatory view showing an example of an extension shape of a ribbon-shaped strip.

In a case in which the ribbon-shaped strip 22 is designed to extend as described above, in particular, in the each side region R, it is further preferable that, as exemplarily shown in the developed plan view of the forming material 21 in FIG. 6 with the main portions thereof in an enlarged state, given that the linear shortest distance between a position shifted from a side end e toward the tire equatorial side by the distance corresponding to the widthwise dimension w1 of the bent ribbon-shaped strip 22, and the position distanced from the side end toward the tire equatorial side by ¼ of the overall width W of the forming material 21, i.e. the linear distance linking the widthwise center points of the ribbon-shaped strip 22 between the above two positions, is A, the curved extension length corresponding to the line connecting the widthwise-center points of the ribbon-shaped strip 22 between the above two positions is B, the thermal shrinkage rate of the aromatic polyamide cord of the primary belt layers 4a, 4b, 4c is α(primary) %, and the thermal shrinkage rate of the organic fiber cord like nylon of the secondary belt layers 5a, 5b is α(secondary) %, the dimensions A and B satisfy a formula below.

$$\alpha(secondary)\% - \alpha(primary)\% - 3\% < (B-A)/B \times 100\% < \alpha(secondary)\% - \alpha(primary)\% + 10\%$$

EXAMPLE 1

Radial tires for use in an airplane having size of 1270×455 R22/32PR as shown in the drawings were prepared by using aromatic polyamide cords as the primary belt layer cords, using nylon or polyethylene terephthalate cords as the secondary belt layer cords, and changing the relative relationship between the dimensions A, B in various manners, such that the respective tires of Examples and Comparative Examples had the respective characteristics as shown in Table 1. The separation resistance properties and the pressure resistance properties of the belt of each tire, as well as the tire weight, were measured. The results are shown in Table 2.

In the examples and comparative examples, the separation resistance properties of the belt was measured by making a tire run repeatedly on a drum having hemispheric projections thereon under the conditions described below and evaluating the number of repetition cycles made before separation in the primary belt occurred.

Load: 243800 N

Inner pressure: 1620 kPa

Testing Speed: 64 km/h

Running Distance: 50 km/1 cycle

Cycle: 60 minutes (5 km running constituted one cycle, and the running was repeated every 60 minutes)

The pressure resistance properties of the belt was measured by increasing the inner pressure of the tire by supplying water into the tire by a pump and measuring the pressure when the belt broke.

The tire weight was measured in order to examine the influence of reducing rubber thickness in a portion defined between the primary belt and the secondary belt layers and between the secondary belt layer end position and the position shifted from the secondary belt layer end position in the widthwise direction by ¼ of the overall width W of the secondary belt layer.

TABLE 1

|  | Examples 1 tire | Examples 2 tire | Examples 3 tire | Comparative Examples 1 tire | Comparative Examples 2 tire | Comparative Examples 3 tire |
| --- | --- | --- | --- | --- | --- | --- |
| Primary belt layer cord (Thermal shrinkage rate %) | Aromatic polyamide (0.1) | Aromatic polyamide (0.1) | Aromatic polyamide (0.1) | Aromatic polyamide (0.1) | Aromatic polyamide (0.1) | Aromatic polyamide (0.1) |
| Secondary belt layer cord (Thermal shrinkage rate %) | Nylon (6) | Nylon (6) | PET (3.9) | Nylon (6) | Nylon (6) | Nylon (6) |
| Rubber gauge (index) between the secondary belt shoulder portion and the primary belt | 100 | 100 | 100 | 100 | 100 | 100 |
| $\Delta\alpha$ ($\alpha$(Secondary)-$\alpha$(Primary)) % | 5.9% | 5.9% | 3.8% | 5.9% | 5.9% | 5.9% |
| (B−A)/B | 5% | 15% | 1% | 0% | 20% | 0% |

TABLE 2

|  | Examples 1 tire | Examples 2 tire | Examples 3 tire | Comparative Examples 1 tire | Comparative Examples 2 tire | Comparative Examples 3 tire |
| --- | --- | --- | --- | --- | --- | --- |
| Separation resistance properties (index) | 100 | 100 | 98 | 70 | 100 | 95 |
| Belt pressure resistance properties (index) | 100 | 98 | 100 | 85 | 93 | 100 |
| Weight (index) | 100 | 100.2 | 99.9 | 99.9 | 100.3 | 104.2 |

(Note that the total weight slightly varied as the cord pass increased)

Regarding the index values in the tables, the larger index values represent the higher result values.

As shown in Table 2, all of the Example tires effectively prevented interlayer rubber thickness between the belt layers from varying, without necessity of increasing rubber thickness, i.e. the tire weight, thereby ensuring good separation resistance properties and further ensuring good pressure resistance properties by preventing distortion of sequence of the primary belt layer cords.

The invention claimed is:

1. A method of producing a pneumatic tire, the pneumatic tire having:

a pair of bead cores; a carcass including at least one carcass ply toroidally extending between the bead cores; a primary belt including a plurality of primary belt layers disposed on the outer peripheral side of the carcass in the crown region thereof; and a secondary belt including at least one secondary belt layer disposed on the outer peripheral side of the primary belt, each primary belt layer being formed by aromatic polyamide cords spirally wound in an annular shape, the secondary belt layer being formed by a ribbon-shaped strip of organic fiber cords having a larger thermal shrinkage rate than that of the aromatic polyamide cords, the ribbon-shaped strip being bent in a zigzag shape at positions corresponding to respective side ends of the secondary belt layer to extend in the circumferential direction, the method comprising:

folding the ribbon-shaped strip in a region, in a developed plan view of a material forming the secondary belt layer, between a side end of the forming material and a position distanced from the side end toward the tire equatorial side by ¼ of the overall width of the forming material, such that the thus bent ribbon-shaped strip extends in a curved manner to build a green tire, wherein given that the linear shortest distance between a position shifted from the side end of the forming material toward the tire equatorial side by the distance corresponding to the widthwise dimension of the bent ribbon-shaped strip and the position distanced from the side end toward the tire equatorial side by ¼ of the overall width of the forming material is A, the curved extension length corresponding to the line of the widthwise-center points of the ribbon-shaped strip between said two positions is B, the thermal shrinkage rate of the aromatic polyamide cord is $\alpha$(primary) %, and the thermal shrinkage rate of the organic fiber cord is $\alpha$(secondary) %, the dimensions A and B satisfy a formula below:

$\alpha$(secondary)%−$\alpha$(primary)%−3%<(B−A)/B×100% < $\alpha$(secondary)%−$\alpha$(primary)%+10%.

2. The method of producing a pneumatic tire of claim 1, wherein the ribbon-shaped strip includes a linearly extending portion between the curved portions.

* * * * *